US009760486B2

(12) United States Patent
Solihin

(10) Patent No.: US 9,760,486 B2
(45) Date of Patent: *Sep. 12, 2017

(54) ACCELERATING CACHE STATE TRANSFER ON A DIRECTORY-BASED MULTICORE ARCHITECTURE

(71) Applicant: EMPIRE TECHNOLOGY DEVELOPMENT LLC, Wilmington, DE (US)

(72) Inventor: Yan Solihin, Apex, NC (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/080,605

(22) Filed: Mar. 25, 2016

(65) Prior Publication Data
US 2016/0210229 A1    Jul. 21, 2016

Related U.S. Application Data

(63) Continuation of application No. 13/319,159, filed as application No. PCT/US2010/062335 on Dec. 29, 2010, now Pat. No. 9,336,146.

(51) Int. Cl.
*G06F 12/00* (2006.01)
*G06F 13/00* (2006.01)
(Continued)

(52) U.S. Cl.
CPC .......... *G06F 12/0804* (2013.01); *G06F 9/461* (2013.01); *G06F 12/0806* (2013.01);
(Continued)

(58) Field of Classification Search
CPC .............. G06F 9/30087; G06F 9/3009; G06F 9/30123; G06F 9/3836; G06F 9/851;
(Continued)

(56) References Cited

U.S. PATENT DOCUMENTS 6,654,858 B1* 11/2003 Asher ................. G06F 12/0817
711/144
6,779,086 B2* 8/2004 Arimilli .............. G06F 12/0831
711/118
(Continued)

FOREIGN PATENT DOCUMENTS

JP    20010236221 A    8/2001
JP    2004054931 A    2/2004
JP    2006501546 A    1/2006

OTHER PUBLICATIONS

Adaptive mechanisms and policies for managing cache hierarchies in chip multiprocessors; Speight et al; 32nd International Symposium on Computer Architecture; Jun. 4-6, 2005 (11 pages).*

(Continued)

*Primary Examiner* — Daniel C Chappell
(74) *Attorney, Agent, or Firm* — Turk IP Law, LLC

(57) ABSTRACT

Technologies are generally described herein for accelerating a cache state transfer in a multicore processor. The multicore processor may include first, second, and third tiles. The multicore processor may initiate migration of a thread executing on the first core at the first tile from the first tile to the second tile. The multicore processor may determine block addresses of blocks to be transferred from a first cache at the first tile to a second cache at the second tile, and identify that a directory at the third tile corresponds to the block addresses. The multicore processor may update the directory to reflect that the second cache shares the blocks. The multicore processor may transfer the blocks from the first cache in the first tile to the second cache in the second tile effective to complete the migration of the thread from the first tile to the second tile.

20 Claims, 6 Drawing Sheets

(51) Int. Cl.
  *G06F 13/28* (2006.01)
  *G06F 12/0804* (2016.01)
  *G06F 12/0817* (2016.01)
  *G06F 9/46* (2006.01)
  *G06F 12/0806* (2016.01)
  *G06F 12/123* (2016.01)
  *G06F 9/48* (2006.01)

(52) U.S. Cl.
  CPC ........ *G06F 12/0817* (2013.01); *G06F 12/123* (2013.01); *G06F 9/4856* (2013.01); *G06F 2212/62* (2013.01); *G06F 2212/69* (2013.01)

(58) Field of Classification Search
  CPC .......... G06F 9/3891; G06F 9/46; G06F 9/461; G06F 9/485; G06F 9/4856; G06F 9/50; G06F 9/5083; G06F 9/5088; G06F 9/52; G06F 12/0804; G06F 12/0806; G06F 12/0808; G06F 12/0811; G06F 12/0813; G06F 12/0815; G06F 12/0817; G06F 12/082; G06F 12/0822; G06F 12/0824; G06F 12/0826; G06F 12/0828; G06F 12/0831; G06F 12/0833; G06F 12/0835; G06F 12/0837; G06F 12/084; G06F 12/0842; G06F 12/0844; G06F 12/0846; G06F 12/0848; G06F 12/0866; G06F 12/0897; G06F 12/12; G06F 12/121; G06F 12/122; G06F 12/123; G06F 12/124; G06F 12/125; G06F 2212/62; G06F 2212/69
  See application file for complete search history.

(56) References Cited

U.S. PATENT DOCUMENTS

| | | | |
|---|---|---|---|
| 6,868,485 B1 | 3/2005 | Conway | |
| 6,976,148 B2 | 12/2005 | Arimilli et al. | |
| 7,047,320 B2 | 5/2006 | Arimilli et al. | |
| 7,478,190 B2 | 1/2009 | Balasubramonian et al. | |
| 7,536,514 B2* | 5/2009 | Barrett | G06F 12/0817 710/100 |
| 7,543,112 B1 | 6/2009 | Chou et al. | |
| 7,626,588 B1 | 12/2009 | Molnar et al. | |
| 7,783,842 B2 | 8/2010 | Arimilli et al. | |
| 7,788,452 B2* | 8/2010 | Averill | G06F 12/0817 711/119 |
| 7,793,044 B1 | 9/2010 | Spracklen et al. | |
| 7,805,575 B1* | 9/2010 | Agarwal | G06F 12/0811 711/141 |
| 7,853,755 B1 | 12/2010 | Agarwal et al. | |
| 7,966,453 B2* | 6/2011 | Shum | G06F 12/0817 711/121 |
| 7,987,321 B1 | 7/2011 | Agarwal et al. | |
| 8,117,397 B2* | 2/2012 | Guthrie | G06F 12/0817 711/128 |
| 8,244,986 B2 | 8/2012 | Solihin | |
| 8,799,581 B2* | 8/2014 | Shen | G06F 12/0817 711/113 |
| 8,904,154 B2* | 12/2014 | Devadas | G06F 9/3824 712/225 |
| 9,009,446 B2* | 4/2015 | Koka | G06F 12/10 711/100 |
| 9,047,194 B2* | 6/2015 | Solihin | G06F 12/0824 |
| 9,235,529 B2* | 1/2016 | Koka | G06F 12/10 |
| 9,274,960 B2* | 3/2016 | Kaxiras | G06F 12/0815 |
| 9,378,069 B2* | 6/2016 | Chiang | G06F 9/4856 |
| 9,384,132 B2* | 7/2016 | Chew | G06F 12/0815 |
| 2003/0009638 A1 | 1/2003 | Sharma et al. | |
| 2003/0069920 A1 | 4/2003 | Melvin et al. | |
| 2004/0019751 A1* | 1/2004 | Sharma | G06F 12/0817 711/154 |
| 2004/0139304 A1 | 7/2004 | Arimilli et al. | |
| 2004/0139305 A1 | 7/2004 | Arimilli et al. | |
| 2005/0050373 A1* | 3/2005 | Orenstien | G06F 1/206 713/320 |
| 2006/0098022 A1 | 5/2006 | Andrews et al. | |
| 2006/0143384 A1 | 6/2006 | Hughes et al. | |
| 2006/0143404 A1 | 6/2006 | Chen et al. | |
| 2008/0244189 A1* | 10/2008 | Allison | G06F 12/0817 711/141 |
| 2009/0024833 A1 | 1/2009 | Deneroff et al. | |
| 2009/0193414 A1 | 7/2009 | Broussard et al. | |
| 2009/0222654 A1 | 9/2009 | Hum et al. | |
| 2010/0274971 A1 | 10/2010 | Solihin | |
| 2011/0078384 A1 | 3/2011 | Kumar et al. | |
| 2011/0153946 A1 | 6/2011 | Solihin | |
| 2011/0258420 A1 | 10/2011 | Devadas et al. | |
| 2012/0137075 A1 | 5/2012 | Vorbach | |
| 2012/0246446 A1 | 9/2012 | Solihin | |
| 2014/0181834 A1* | 6/2014 | Lim | G06F 9/5088 718/105 |
| 2016/0179674 A1* | 6/2016 | Sury | G06F 12/0833 711/141 |

OTHER PUBLICATIONS

Push-assisted migration of real-time tasks in multi-core processors; Sarkar et al; Proceedings of the 2009 ACM SIGPLAN/SIGBED conference on Languages, compilers, and tools for embedded systems; Jun. 19-20, 2009; pp. 80-89 (10 pages).*
Performance Implications of Single Thread Migration on a Chip Multi-Core, Constantinou et al, ACM SIGARCH Computer Architecture News, vol. 33, No. 4, Sep. 2005, pp. 80-91 (12 pages).*
Chaparro, P., et al., "Thermal-Aware Clustered Microarchitectures," IEEE International Conference on Computer Design (ICCD'04), pp. 48-53, (Oct. 11-13, 2004).
Constantinou, T., et al., "Performance Implications of Single Thread Migration on a Chip Multi-Core," ACM SIGARCH Computer Architecture News, vol. 33, No. 4, pp. 80-91, (Sep. 2005).
Hammoud, M., et al., "ACM: An Efficient Approach for Managing Shared Caches in Chip Multiprocessors," Proceedings of the 4th Int'l Conference on High Performance Embedded Architectures and Compilers, vol. 5409, pp. 355-372, (Jan. 2009).
Hennessy, JL., et al., "Computer Architecture A Quantitative Approach," 3rd Edition, p. 533, (2002).
International Search Report and Written Opinion for PCT Application No. PCT/US10/62335 mailed Jul. 26, 2011.
Li, T., et al., "Efficient Operating System Scheduling for Performance-Asymmetric Multi-Core Architectures," Proceedings of the 2007 ACM/IEEE Conference on Supercomputing, 2007, SC '07, pp. 1-11, (Nov. 10-16, 2007).
Li, T., et al., "Operating System Support for Overlapping-ISA Heterogeneous Multi-Core Architectures," 2010 IEEE 16th International Symposium on High Performance Computer Architecture (HPCA), pp. 1-12, (Jan. 9-14, 2010).
Powell, M., et al., "Architectural Core Salvaging in a Multi-Core Processor for Hard-Error Tolerance," ISCA '09 Proceedings of the 36th Annual International Symposium on Computer Architecture 2009, pp. 93-104, (Jun. 20-24, 2009).
Suleman, M., et al., "Accelerating Critical Section Execution with Asymmetric Multi-Core Architectures," Proceedings of the 14th International Conference on Architectural Support for Programming Languages and Operating Systems, ASPLOS 2009, pp. 253-264, (Mar. 2009).
Zhu, W., et al., "JESSICA2: a distributed Java Virtual Machine with transparent thread migration support," 2002 IEEE International Conference on Cluster Computing 2002, pp. 381-388, (2002).
Zuo, W., et al., "Group-caching for NoC Based Multicore Cache Coherent Systems," DATE '09 Proceedings of the Conference on Design, Automation and Test in Europe 2009, pp. 755-760, (Apr. 20-24, 2009).

* cited by examiner

600 A COMPUTER PROGRAM PRODUCT

602 A SIGNAL BEARING MEDIUM

604 AT LEAST ONE OF
  ONE OR MORE INSTRUCTIONS FOR INITIATING MIGRATION OF A THREAD EXECUTING ON A FIRST CORE AT A FIRST TILE FROM THE FIRST TILE TO A SECOND TILE IN A MULTICORE PROCESSOR;
  ONE OR MORE INSTRUCTIONS FOR DETERMINING BLOCK ADDRESSES OF BLOCKS TO BE TRANSFERRED FROM A FIRST CACHE AT THE FIRST TILE TO A SECOND CACHE AT THE SECOND TILE;
  ONE OR MORE INSTRUCTIONS FOR IDENTIFYING A THIRD TILE COMPRISING A DIRECTORY CORRESPONDING TO THE BLOCK ADDRESSES;
  ONE OR MORE INSTRUCTIONS FOR UPDATING THE DIRECTORY TO REFLECT THAT THE SECOND CACHE SHARES THE BLOCKS; OR
  ONE OR MORE INSTRUCTIONS FOR TRANSFERRING THE BLOCKS FROM THE FIRST CACHE TO THE SECOND CACHE.

| 606 A COMPUTER-READABLE MEDIUM | 608 A RECORDABLE MEDIUM | 610 A COMMUNICATIONS MEDIUM |

ACCELERATING CACHE STATE TRANSFER ON A DIRECTORY-BASED MULTICORE ARCHITECTURE

CROSS-REFERENCE TO RELATED APPLICATIONS

This application is a continuation application under 35 U.S.C.§120 of U.S. patent application Ser. No. 13/319,159, filed on Nov. 7, 2011, now U.S. Pat. No. 9,336,146, which in turn is the U.S. National Stage filing under 35 U.S.C.§371 of International Application No. PCT/US10/62335, filed on Dec. 29, 2010. The disclosures of U.S. patent application Ser. No. 13/319,159 and International Application No. PCT/US10/62335 are hereby incorporated by reference in their entireties.

BACKGROUND

Unless otherwise indicated herein, the materials described in this section are not prior art to the claims in this application and are not admitted to be prior art by inclusion in this section.

As more and more cores become integrated into a single multicore chip, thread migration may be increasingly utilized in order to manage and improve functionality, performance, and/or temperature of the multicore chip. In a typical thread migration scenario, a first core may execute a thread and utilize a first cache. As the first core executes the thread, the first cache may fill with requested data retrieved from memory. After the first cache fills, the first cache may yield cache hits whereby the first core can efficiently retrieve the requested data from the first cache.

During a thread migration, a controller may migrate the thread from the first core to a second core such that the second core takes over execution of the thread. The second core may utilize a second cache that is "cold" (i.e., empty). As a result, the second cache may yield, instead of cache hits, cache misses whereby the requested data is not found in the second cache. After each cache miss, the requested data may be fetched on-demand from another cache, such as the first cache, on the multicore chip. When the second cache "warms up" (i.e., fills with the requested data), the second cache may experience cache hits. However, warming up the second cache through on-demand fetching can incur significant time and energy costs. Such costs can be especially burdensome when filling large caches and in architectures implementing frequent thread migration.

SUMMARY

The present disclosure generally describes techniques for accelerating a cache state transfer in a multicore processor. An example multicore processor may include a first tile, a second tile, and a third tile. The multicore processor may be configured to perform methods where the cache state transfer may be accelerated. Some example methods may include initiating migration of a thread executing on the first core at the first tile in the multicore processor from the first tile to the second tile in the multicore processor, where the first tile comprises the first core and a first cache, and the second tile comprises a second core and a second cache. Example methods may further include determining block addresses of blocks to be transferred from the first cache to the second cache, and identifying the third tile in the multicore processor, the third tile comprising a directory that corresponds to the block addresses. Example methods may also include updating the directory to reflect that the second cache shares the blocks, and transferring the blocks from the first cache in the first tile to the second cache in the second tile effective to complete the migration of the thread from the first tile to the second tile.

The present disclosure generally also describes some multicore processors. Some example multicore processors may include a first tile, a second tile, and a third tile. The first tile may include a first core, a first cache, and a first directory. The second tile may include a second core, a second cache, and a second directory. The third tile may include a third core, a third cache, and a third directory. The multicore processor may be configured to initiate migration of a thread executing on the first core at the first tile from the first tile to the second tile. The multicore processor may also be configured to determine block addresses of blocks to be transferred from the first cache to the second cache, and identify that the directory corresponds to the block addresses. The multicore processor may further be configured to update the directory to reflect that the second cache shares the blocks. The multicore processor may also be configured to transfer the blocks from the first cache in the first tile to the second cache in the second tile effective to complete the migration of the thread from the first tile to the second tile.

The present disclosure also generally describes some multicore processors. Some example multicore processors may include a first tile, a second tile, a third tile, and a fourth tile. The first tile may include a first core, a first cache, and a first directory. The second tile may include a second core, a second cache, and a second directory. The third tile may include a third core, a third cache, and a third directory. The fourth tile may include a fourth core, a fourth cache, and a fourth directory. The multicore processor may be configured to initiate migration of a thread executing on the first core from the first tile to the second tile. The multicore processor may also be configured to determine a first set of block addresses of first blocks and a second set of block addresses of second blocks to be transferred from the first cache to the second cache. The multicore processor may further be configured to identify that the third directory corresponds to the first set of block addresses, and may identify that the fourth directory corresponds to the second set of block addresses. The multicore processor may also be configured to update the third directory to reflect that the second cache shares the first blocks, and may update the fourth directory to reflect that the second cache shares the second blocks. The multicore processor may be configured to transfer the first blocks and the second blocks from the first cache to the second cache effective to complete the migration of the thread from the first tile to the second tile. The multicore processor may be configured to execute the thread on the second core.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 is a schematic diagram illustrating computer program products, all arranged according to at least some embodiments presented.

DETAILED DESCRIPTION

Figure 1:
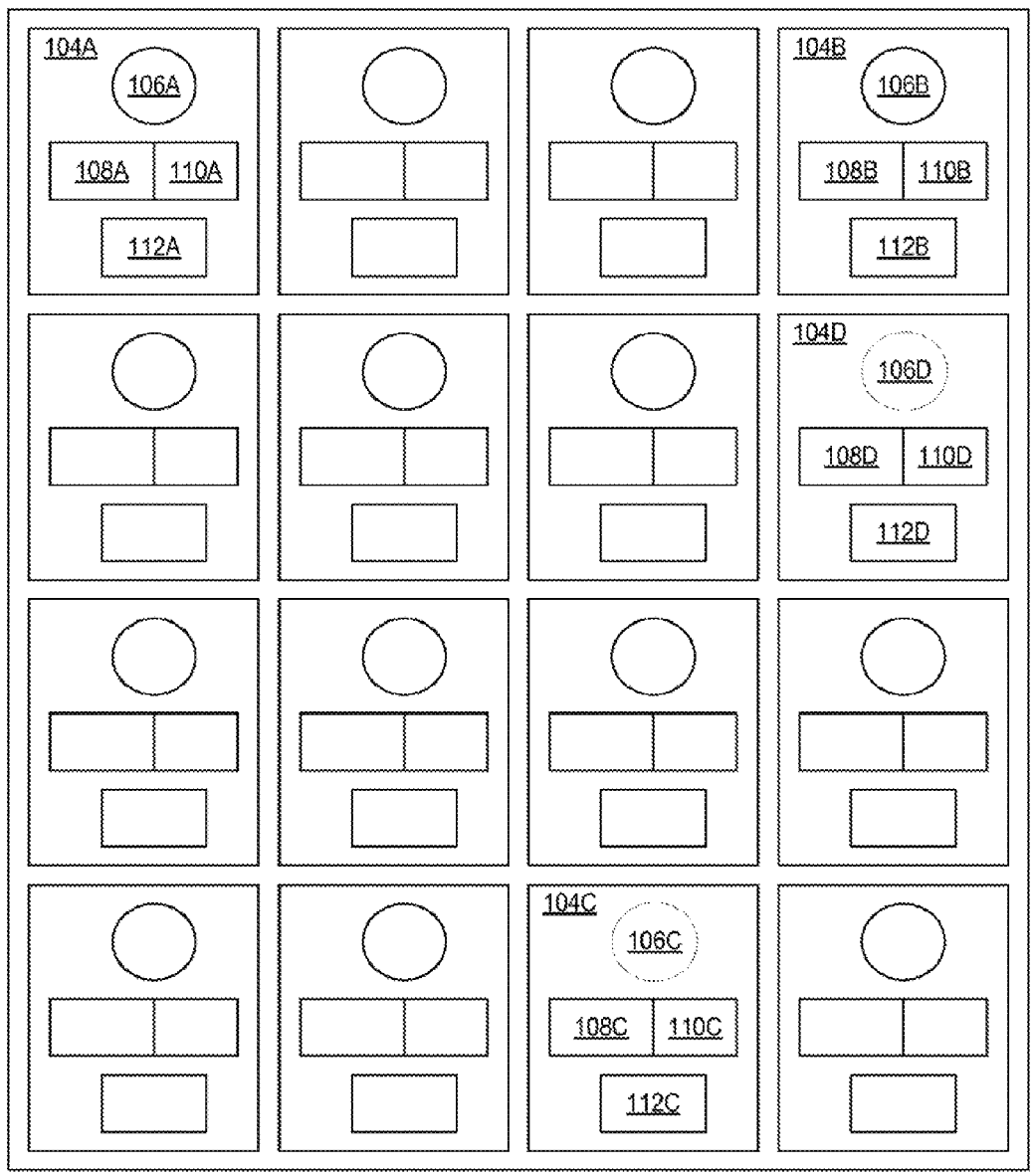
FIG. 1 is a functional block diagram illustrating an example directory-based multicore architecture adapted to accelerate cache state transfer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to a directory-based multicore architecture adapted to transfer cache state between appropriate caches during or after a thread migration. In an illustrative example, a multicore processor may include a first tile, a second tile, and a third tile. The first tile may include a first core, an associated first cache, and a first directory. The second tile may include a second core, an associated second cache, and a second directory. The third tile may include a third core, an associated third cache, and a third directory. The first core may be configured to execute a thread. As the first core executes the thread, the first cache may fill with data retrieved from memory. The data may be associated with one or more block addresses. In this example, these block addresses may correspond to the third directory. That is, the third directory may indicate that the data corresponding to the block addresses can be found in the first cache.

A controller may be configured to migrate the thread from the first tile to the second tile. In this way, the second core can take over execution of the thread from the first core. The controller may be also configured to determine the block addresses associated with the data stored in the first cache and identify the directory corresponding to the block addresses. In this example, the third directory may correspond to the block addresses. As a result, the controller may be configured to update the third directory to reflect that the second cache contains the data. The controller may also be configured to transfer the data from the first cache to the second cache. When the second core executes the thread, the second cache can yield cache hits because the data in the first cache has been transferred to the second cache.

Turning now to FIG. 1, a functional block diagram illustrates an example directory-based multicore architecture 100 adapted to accelerate cache state transfer, in accordance with at least some embodiments presented herein. The architecture 100 may include multiple tiles, including a tile A 104A, a tile B 104B, a tile C 104C, and a tile D 104D. The tiles 104A-104D may include cores 106A-106D, caches 108A-108D, and directories 110A-110D. The tiles 104A-104D may be collectively or generally referred to as tiles 104. The cores 106A-106D may be collectively referred to as cores 106. The caches 108A-108D may be collectively or generally referred to as caches 108. The directories 110A-110D may be collectively or generally referred to as directories 110. In the example illustrated in FIG. 1, the architecture 100 may include sixteen tiles 104. In other embodiments, the architecture 100 may include any suitable number of tiles and/or any suitable number of cores in a tile sharing a cache.

Each of the cores 106, the caches 108, and the directories 110 may correspond to one of the tiles 104. The tiles 104 may further include controllers 112A-112D. The controllers 112A-112D may be collectively or generally referred to as controllers 112. The controllers 112 may be configured to perform operations on the respective caches 108 and the respective directories 110, as well as to enable communications between the tiles 104. In some other embodiments, one or more of the tiles 104 may each include multiple controllers, such as separate cache controllers and directory controllers.

The directories 110 may each be configured to map block addresses to one or more of the caches 108 that store blocks corresponding to the block addresses. Each of the directories 110 may be associated with a set of block addresses, for example, a range of sequential addresses. In some other implementations, the block addresses assigned to each of the directories 110 may be non-sequential (e.g., interleaved at various granularities). A group of block addresses may be equally allocated among the directories 110. For example, the directory A 110A may be associated with a first range of sequential block addresses, the directory B 110B may be associated with a second range of sequential block addresses, and so forth. The mapping between the directories 110 and the block addresses may be fixed or variable. Further, the mapping between the directories 110 may be known by the controllers 112 or retrieved by the controllers 112 from a suitable source.

Figure 2:
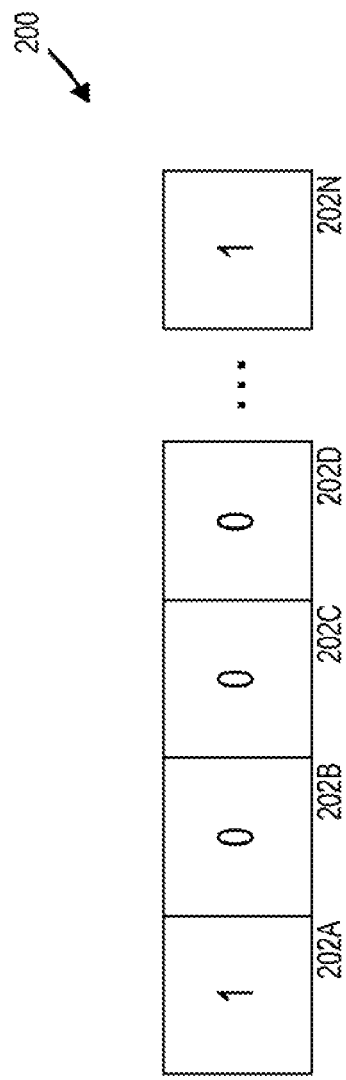
FIG. 2 is a functional block diagram illustrating an example bit vector adapted to indicate one or more of the caches that store a block corresponding to a given block address.

In some embodiments, each of the directories 110 may include multiple bit vectors each of which corresponds to one of the respective set of block addresses. An illustrative example of a bit vector is shown in FIG. 2, which is described in greater detail below. Each bit vector may be configured to store a number of bits corresponding to the number of the caches 108. For example, each bit vector may be configured to store sixteen bits, where each bit corresponding to one of sixteen caches (e.g., caches 108 of FIG. 1). Each of the sixteen bits may be configured with one of at least two bit values. A first bit value (e.g., logical "1") may indicate that a corresponding cache stores the block corresponding to the block address associated with the bit vector. A second bit value (e.g., logical "0") may indicate that the corresponding cache does not store the block corresponding to the block address associated with the bit vector. Various other embodiments may rely on other suitable directory formats, such as coarse bit vector, limited pointers, or sparse directory.

In a first example implementation, the tile D 104D may be configured to execute a thread through the core D 106D. While executing the thread, the core D 106D may retrieve data from memory (not shown) and store the data on the cache D 108D. The controller D 112D may be adapted to migrate the thread from the tile D 104D to the tile A 104A such that core A 106A may then execute the thread. Because the cache A 108A may initially be cold, the cache A 108A may yield cache misses for requested data during the execution of the thread. In response to each cache miss, the controller A 112A may be configured to determine the directory that is mapped to the block address of the requested data. As previously described, the mapping between ranges of block addresses and the respective directories 110 may be known by the controllers 112 or retrieved from a suitable source.

In this first example, the controller A 12A may determine that the directory C 110C maps the block address of the requested data. As a result, the controller A 112A may be adapted to query the controller C 112C for caches that store a block corresponding to the block address. The directory C 110C may include a bit vector that identifies caches that store the block corresponding to block address. In this first example, the directory C 110C may identify that the cache C 108C stores the block corresponding to the block address. Thus, the controller C 112C may be configured to read the directory C 110C, retrieve the block from the cache C 108C, and respond to the query by providing the block to the controller A 112A. The controller A 112A may then store the block in the cache A 108A.

In the first example described above, the directory mapped to the block address and the cache storing the respective block are contained within the same tile. While the first example illustrates a relatively straightforward, two-hop coherence transaction involving tile A 104A and tile C 104C, the cache that stores the requested data is seldom in the same tile as the directory. That is, the cache that stores the requested data is typically in a different tile than the directory, as illustrated in another example below. In many of these cases, the requested data will be found in the cache contained in the tile from where the thread is migrated.

In a second example implementation, the controller A 112A may be configured to determine that the directory B 110B maps the block address of the requested data. As a result, the controller A 112A may be adapted to query the controller B 112B for caches that store a block corresponding to the block address. The directory B 110B may include a bit vector that identifies caches that store the block corresponding to the block address. In this second example, the directory B 110B may identify that the cache D 108D stores the block corresponding to the block address. Thus, the controller B 112B may be adapted to forward the query to the controller D 112D. The controller D 112D may respond to the query by providing the block from the cache D 108D to the controller A 12A. The controller A 112A may then store the block in the cache A 108A.

In contrast to the two-hop coherence transaction described in the first example, the second example involves a three-hop coherence transaction between tile A 104A, tile B 104B, and tile D 104D. Three-hop transactions can be costly, especially since the cache A 108A may yield many cache misses when the cache A 108A is cold. Further, each transaction may be sequentialized, which can also be very costly. That is, the controller A 12A may be adapted to initiate a separate query for the requested data after each cache miss, even though, in many cases, the data will be retrieved from the same source (e.g., cache D 108D in the second example). A third example implementation will now be described that addresses various drawbacks of the first and second example implementations described above.

In the third example implementation, when the controller D 112D is configured to initiate a migration of the thread from the tile D 104D to the tile A 104A, the controller D 112D may also be configured to determine block addresses for blocks stored in the cache D 108D. The controller D 112D may be adapted to determine the block addresses for blocks stored in the cache D 108D by scanning a cache tag array (not shown) of the cache D 108D. Upon determining the block addresses for block stored in the cache D 108D, the controller D 112D may be adapted to determine the directories that map to the block addresses.

In this third example, the controller D 112D may be configured to determine that the directory B 110B and the directory C 110C map to a first set of the block addresses and a second set of the block addresses, respectively. As a result, the controller D 112D may be adapted to instruct the controller B 112B to update the directory B 110B to indicate that the tile A 104A is a sharer of blocks corresponding to the first set of the block addresses. The controller B 112B may be adapted to update the directory B 110B by changing, within the bit vectors corresponding to the first set of the block addresses, the bit value of the bits corresponding to the cache A 108A. The controller D 112D may also be configured to instruct the controller C 112C to update the directory C 110C to indicate that the tile A 104A is a sharer of blocks corresponding to the second set of the block addresses. The controller C 112C may also be configured to update the directory C 110C by changing, within the bit vectors corresponding to the second set of the block addresses, the bit value of the bits corresponding to the cache A 108A.

In some embodiments, the controller D 112D may be adapted to instruct the controller B 112B to update the directory B 110B to indicate that the tile A 104A is a sharer of blocks corresponding to the first set of the block addresses by sending a single message. The controller D 112D may also be adapted to instruct the controller C 112C to update the directory C 110C to indicate that the tile A 104A is a sharer of blocks corresponding to the second set of the block addresses by sending a single message. For example, the message may include a list of block addresses and an identifier of the cache, such as the cache A 108A, to which the blocks are transferred. By sending a single message that includes multiple block addresses, the controllers 112 can more efficiently update relevant directories as compared to on-demand fetching where a separate message is sent per block address that is missed in the cache.

When controller B 112B updates the directory B 110B to indicate that the tile A 104A is a sharer of blocks, the controller B 112B may be adapted to send a first directory acknowledgment message to the controller D 112D. The first directory acknowledgement message may indicate that the directory B 110B has been successfully updated, or queued for subsequent update to be performed in the future. When controller D 112D updates the directory D 110D to indicate that the tile A 104A is a sharer of blocks, the controller D 112D may be adapted to send a second directory acknowledgement message to the controller D 112D. The second directory acknowledgment message may indicate that the directory C 110C has been successfully updated, or queued for subsequent update to be performed in the future.

Upon receiving the relevant directory acknowledgments, the controller D 112D may be adapted to initiate a transfer of blocks from the cache D 108D to the cache A 108A. When the controller A 112A has completed the transfer of blocks to the cache A 108A, the controller A 112A may be configured to send a cache acknowledgement to the controller D 112D. The cache acknowledgment may indicate that the blocks have been successfully transferred, or queued for an eventual placement in the cache A 108A. At least one block may be transferred between the cache D 108D and the cache A 108A at a given time. Transferring more than one block at a given time may provide greater efficiency in the architecture 100 in terms of reducing latency, bandwidth consumed, and/or energy consumed. Blocks that are transferred together may also be compressed for greater efficiency.

When the controller D 112D transfers blocks from the cache D 108D to the cache A 108A, the controller D 112D may replicate or move the blocks from the cache D 108D to the cache A 108A. When the controller D 112D replicates the blocks from the cache D 108D to the cache A 108A, the blocks may remain on both the cache D 108D and the cache A 108A for some period of time. For example, replication may be utilized for implementations where execution of the thread by the core A 106A is temporary and is expected to quickly return to the core D 106D. When replicating blocks, the controller D 112D may also send an instruction to a main memory controller in order to clean dirty entries (e.g., recently written entries) of the blocks. In this way, the copies of the block in the cache and the main memory match. In addition, some coherence protocols may allow dirty entries to be kept in the cache without updating the main memory until the blocks are evicted from the cache. When the controller D 112D moves the blocks from the cache D 108D to the cache A 108A, the blocks in the cache D 108D may be immediately invalidated, thereby making cache D 108D available for other threads that may be executed later by the core D 106D. For example, moving may be utilized for implementations where execution of the thread by the core A 106A is longer term and is not expected to quickly return to the core D 106D.

When the controller D 112D transfers blocks from the cache D 108D to the cache A 108A, the controller D 112D may transfer some or all of the blocks in the cache D 108D to the cache A 108A. Limiting the number of blocks that are transferred can reduce the bandwidth consumed. For example, the controller D 112D may implement a most recently used ("MRU") transfer policy whereby only a suitable number of MRU blocks are transferred from the cache D 108D to the cache A 108A. The number of MRU blocks may be determined based on the thread's access patterns (e.g., the thread's temporal reuse behavior).

When the controller D 112D transfers blocks from the cache D 108D to the cache A 108A, the controller D 112D may be adapted to transfer the blocks in any suitable order. In some embodiments, the controller D 112D may be configured to transfer the blocks in a sequential order according to the block addresses of the blocks. In some other embodiments, the controller D 112D may be configured to transfer the blocks in an order from most recently used to least recently used. In yet some other embodiments, the controller D 112D may be configured to transfer instruction blocks before transferring data blocks.

As described above in some embodiments, the controller D 112D may be adapted to initiate the transfer of blocks after receiving the directory acknowledgments. In some other embodiments, the controller D 112D may be configured to initiate the transfer of blocks before receiving the directory acknowledgments. That is, the controller D 112D may transfer the blocks concurrently with updating the directories. However, such an approach can lead to incoherent caches if the controller A 112A has completed the transfer of blocks to the cache A 108A before the directory B 110B and/or the directory C 110C has been updated to reflect that the cache A 108A contains the blocks.

An invalidation request or an intervention request may be broadcast to sharers of a block based on information contained in a corresponding directory. For example, the controller D 112D may receive an invalidation request or an intervention request that affects a block stored in the cache D 108D based on information contained in the directory B 110B. However, if the directory B 110B has not yet been updated, then the directory B 110B may indicate that only the cache D 108D contains a copy of the block. That is, the directory B 110B may not indicate that the cache A 108A also contains a copy of the block. As a result, when the block is invalidated or intervened, the copy of the block in the cache D 108D may be different from the copy of the block in the cache A 108A.

In order to address this possible incoherency between caches, the tile D 104D may be configured to maintain a record of blocks where a transfer has been initiated but where corresponding directory acknowledgements have not yet been received. That is, the record may indicate that the cache A 108A also contains a copy of the block. When the controller D 112D receives an invalidation request or an intervention request, the controller D 112D may be adapted to forward the invalidation request or the intervention request to the controller A 112A based on the record. In this way, the copy of the block in the cache A 108A can be invalidated or intervened accordingly. In various embodiments, the record may be embodied in a transfer status table ("TST"), which is described in greater detail below with reference to FIG. 3.

Turning now to FIG. 2, a functional block diagram illustrates an example bit vector 200 adapted to indicate one or more of the caches 108 that store a block corresponding to a given block address, in accordance with at least some embodiments presented herein. A given directory may include multiple bit vectors corresponding to multiple block addresses. The bit vector 200 may include a first bit 202A, a second bit 202B, a third bit 202C, a fourth bit 202D, and an Nth bit 202N. The first bit 202A may correspond to a first cache in a multicore architecture. The second bit 202B may correspond to a second cache in the multicore architecture. The third bit 202C may correspond to a third cache in the multicore architecture. The fourth bit 202D may correspond to a fourth cache in the multicore architecture. The Nth bit 202N may correspond to an Nth cache in the multicore architecture. Other directory formats, such as sparse directory, limited pointers, or coarse directory, may also be utilized.

In the example illustrated in FIG. 2, a logical one bit value may indicate that the corresponding cache stores the block, and a logical zero bit value may indicate that the corresponding cache does not store the block. Thus, the logical one bit values in the first bit 202A and the Nth bit 202N may indicate that the first cache and the Nth cache share the block. The bit vector 200 may be configured to store a number of bits corresponding to the number of caches in the multicore architecture. The bit vector 200, along with coherence states, may be dynamically updated as additional caches share the block and/or as caches become invalidated or intervened.

Figure 3:
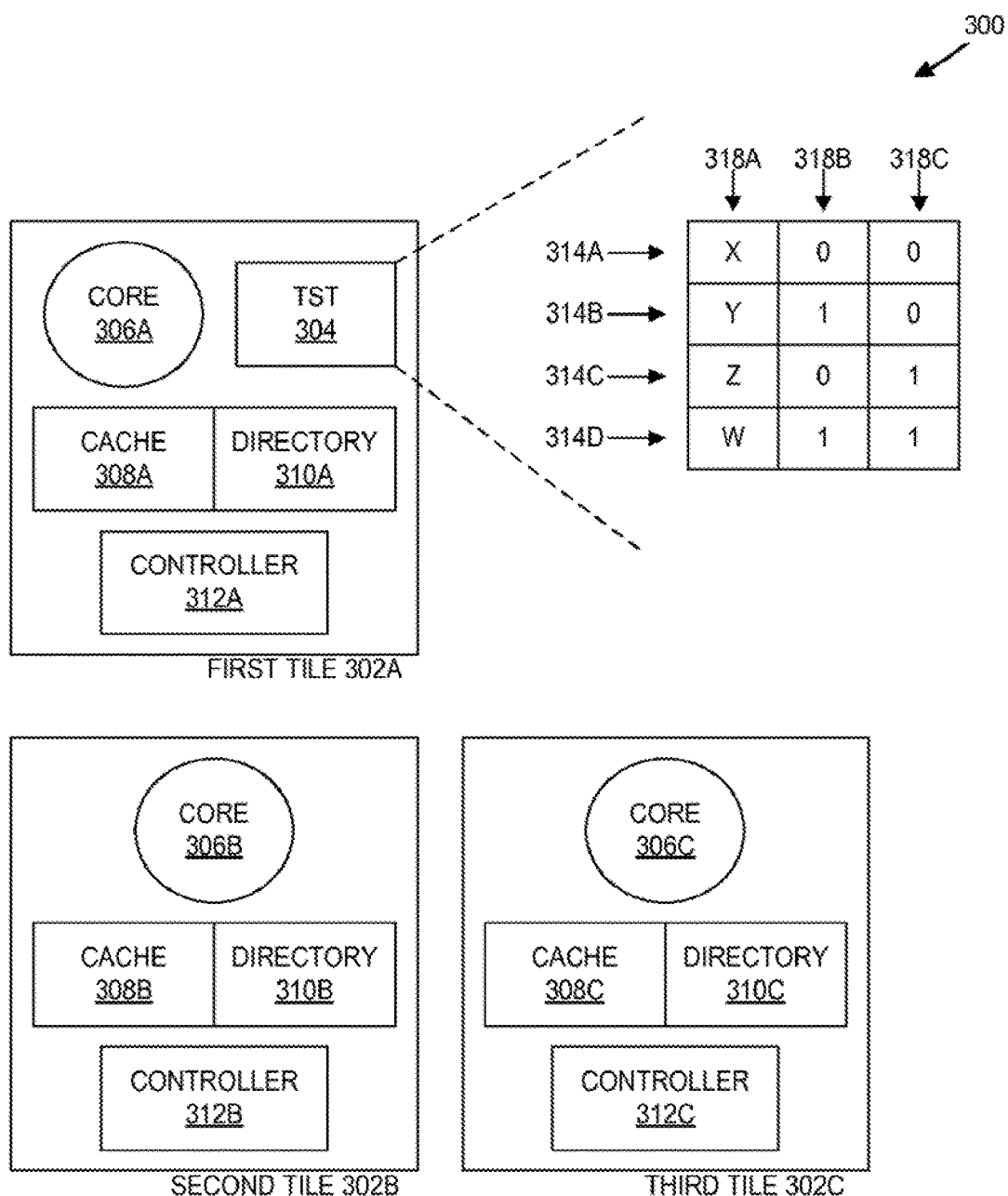
FIG. 3 is a functional block diagram illustrating an example directory-based multicore architecture adapted to maintain, for each block transferred from a given tile, a record indicating directory status and tile status.

Turning now to FIG. 3, a functional block diagram illustrates an example directory-based multicore architecture 300 adapted to maintain, for each block transferred from a given tile, a record indicating directory status and tile status, in accordance with at least some embodiments presented herein. The architecture 300 may include a first tile 302A, a second tile 302B, and a third tile 302C. The first tile 302A may include a transfer status table ("TST") 304, a core 306A, a cache 308A, a directory 310A, and a controller 312A. The second tile 302B and the third tile 302C may include respective cores 306B-306C, caches 308B-308C, directories 310B-310C and controllers 312B-312C.

The TST 304 may be configured to include a plurality of rows, including a first row 314A, a second row 314B, a third row 314C, and a fourth row 314D. Each of the rows 314A-314D may correspond to a block stored in the cache 308A for which the controller 312A has initiated the transfer of the block to another tile (e.g., second tile 302B) and has sent an instruction to yet another tile (e.g., third tile 302C) to update a corresponding directory. In the example illustrated in FIG. 3, the first row 314A may correspond to a block X, and the second row 314B may correspond to a block Y. Further, the third row 314C may correspond to a block Z, and the fourth row 314D may correspond to a block W. The TST 304 may be separate from or integrated with a cache tag array of the cache 308A, according to various embodiments.

The TST 304 may further include a plurality of columns, including a first column 318A, a second column 318B, and a third column 318C. Table entries under the first column 318A may be configured to store a block tag or other suitable identifier for the blocks 214A-214D. Table entries under the second column 318B may be configured to store a bit corresponding to the directory status. Table entries under the third column 318C may be configured to store a bit corresponding to the tile status. The directory status may indicate whether a given directory has been updated after the controller 312A has sent an instruction to update the directory. A given directory may be considered successfully updated when the controller 312A receives a corresponding directory acknowledgment. The tile status may indicate whether the transfer of a given block has been completed. The transfer of a given block may be considered successfully completed when the controller 312A receives a corresponding cache acknowledgment. The directory that is updated and the cache to which the block is transferred may or may not reside on the same tile.

In the example illustrated in FIG. 2, a logical zero bit value under the second column 318B (i.e., the directory status column) may represent that the controller 312A has sent, to the controller 312C, a message to update the directory 310C. However, the controller 312A has yet to receive, from the controller 312C, a directory acknowledgement indicating that the directory 310C has been successfully updated. A logical one bit value under the second column 318B may represent that the controller 312A has received, from the controller 312C, the directory acknowledgment. A logical zero bit value under the third column 318C (i.e., the tile status column) may represent that the controller 312A has initiated the transfer of a given block to the second tile 302B. However, the controller 312A has yet to receive, from the controller 312B, a cache acknowledgment indicating that the block has been successfully transferred. A logical one bit value under the third column 318C may represent that the controller 312A has received, from the controller 312B, the cache acknowledgment.

The table entries on the first row 314A, which corresponds to the block X, include a logical zero bit value for the directory status and a logical zero bit value for the tile status. That is, the controller 312A has yet to receive a directory acknowledgement or a cache acknowledgment with respect to the block X. The table entries on the second row 314B, which corresponds to the block Y, include a logical one bit value for the directory status and a logical zero bit value for the tile status. That is, the controller 312A has received the directory acknowledgement but has yet to receive the cache acknowledgment with respect to the block Y.

The table entries on the third row 314C, which corresponds to the block Z, include a logical zero bit value for the directory status and a logical one bit value for the tile status. That is, the controller 312A has yet to receive the directory acknowledgment but has received the cache acknowledgment with respect to the block Z. The table entries on the fourth row 314D, which corresponds to the block W, include a logical one bit value for the directory status and a logical one bit value for the tile status. That is, the controller 312A has received the directory acknowledgment and the cache acknowledgment. Due to the completion of both the directory update and cache transfer, the block W is subsequently ready to be removed from the TST 304.

The controller 312A may be configured to utilize the TST 304 in order to determine whether to maintain (e.g., buffer) and forward invalidation and/or intervention requests to the controller 312B. When the directory status and the tile status both have logical one bit values, the directory 310C may properly indicate that the cache 308B shares the given block. As a result, the controller 312B may properly receive a broadcast of any invalidation and/or intervention requests. In this case, the controller 312A may be configured to not maintain or forward invalidation and/or intervention requests to the controller 312B.

When the directory status has a logical zero bit value, then the directory 310C may not properly indicate that the cache 308B shares the given block. As a result, the controller 312B may not receive a broadcast of any invalidation and/or intervention requests. In this case, the controller 312A may be configured to maintain and forward the invalidation and/or intervention requests to the controller 312B. If the tile status is a logical one bit value, then the cache 308B may store the block. In this case, the controller 312A may be configured to immediately forward the invalidation and/or intervention requests to the controller 312B.

If the tile status is a logical zero bit value, then the cache 308B may not store the block. In this case, the controller 312A may be configured to delay forwarding the invalidation and/or intervention requests to the controller 312B until the controller 312A receives the cache acknowledgment. When the directory status is a logical one bit value and the tile status is a logical zero bit value, the directory 310C may be properly updated, but the cache 308B may not store the block. In this case, the controller 312A may be configured to forward the invalidation and/or intervention requests to the controller 312B when the controller 312A receives the cache acknowledgment.

Figure 4:
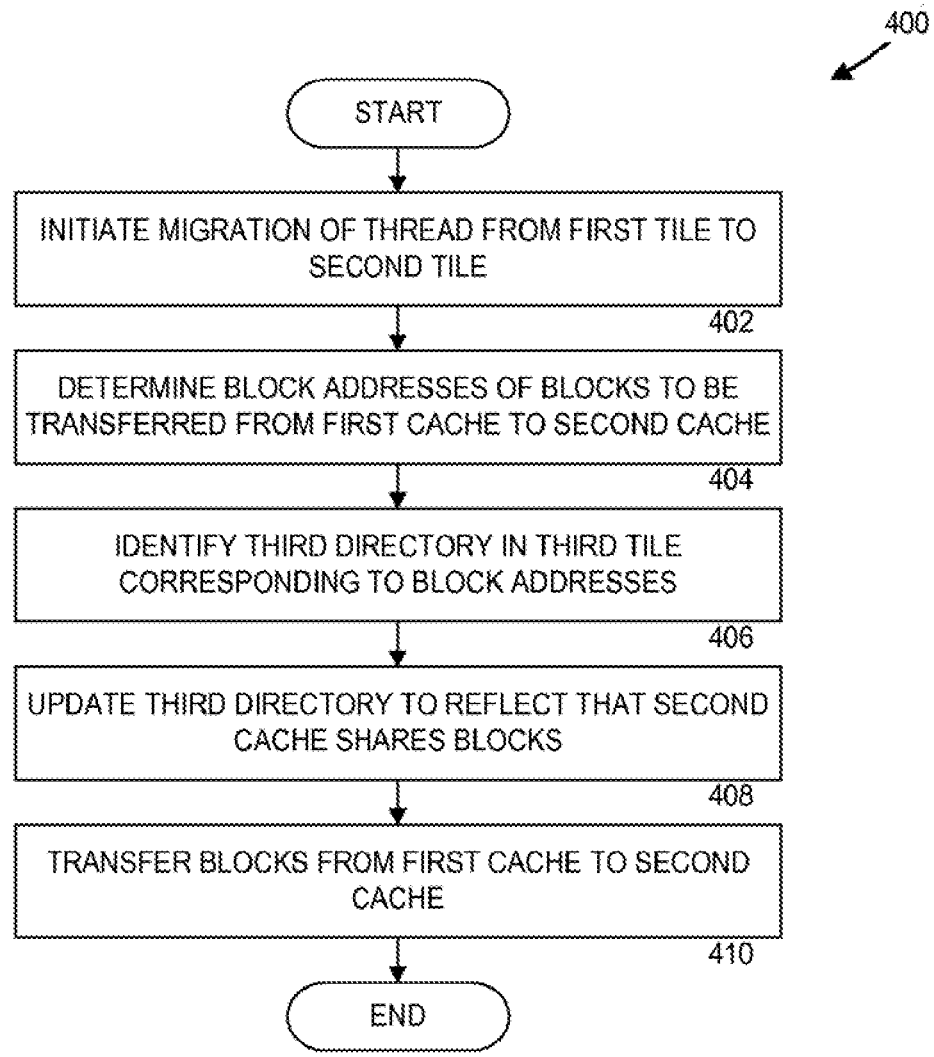
FIG. 4 is a flow diagram illustrating an example process for accelerating cache state transfer in the multicore architecture.

Turning now to FIG. 4, a flow diagram illustrates an example process 400 adapted to accelerate cache state transfer in a multicore architecture, in accordance with at least some embodiments presented herein. The process 400 may include various operations, functions, or actions as illustrated by one or more of blocks 402 through 410. The operations may not strictly follow a sequential order shown in FIG. 4. For example, two operations may be overlapped with one another.

Process 400 may begin at block 402 (Migrate Thread from First Tile to Second Tile), where a controller may be configured to migrate a thread from a first tile to a second tile. As a result of the migration, a second core in the second tile can take over execution of the thread from a first core in the first tile. A multicore architecture, such as a multicore processor, may include the first tile, the second tile, and a third tile. The first tile may include the first core, a first cache, and a first directory. The second tile may include the second core, a second cache, and a second directory. The third tile may include a third core, a third cache, and a third directory. Block 402 may be followed by block 404.

At block 404 (Determine Block Addresses of Blocks to be Transferred from First Cache to Second Cache), the controller may be configured to determine one or more block addresses of blocks to be transferred from the first cache to the second cache. In some embodiments, the controller may be configured to determine the block addresses of blocks to be transferred from the first cache to the second cache by scanning a cache tag array associated with the first cache. Block 404 may be followed by block 406.

At block 406 (Identify Third Directory in Third Tile Corresponding to Block Addresses), the controller may be configured to identify the third directory that corresponds to the block addresses. The mapping between range of block addresses and directories may be fixed or variable. The controller may know the mapping (e.g., hard-coded on the controller) or retrieve the mapping from a suitable source (e.g., memory, storage device, database, etc.). Block 406 may be followed by block 408.

At block 408 (Update Third Directory to Reflect that Second Cache Shares Blocks), the controller may be configured to update the third directory to reflect that the second cache shares the blocks along with the first cache. In some embodiments, the controller may be configured to send an instruction to the third tile to update the directory. The third tile may be configured to update the directory by changing, within relevant bit vectors, bit values of bits corresponding to the second cache. Block 408 may be followed by block 410.

At block 410 (Transfer Blocks from First Cache to Second Cache), where the controller may be configured to transfer the blocks from the first cache to the second cache effective to complete the migration of the thread from the first tile to the second tile. After block 410, the process 400 may either repeat (e.g., periodically, continuously, or on demand as needed) or terminate.

Figure 5:
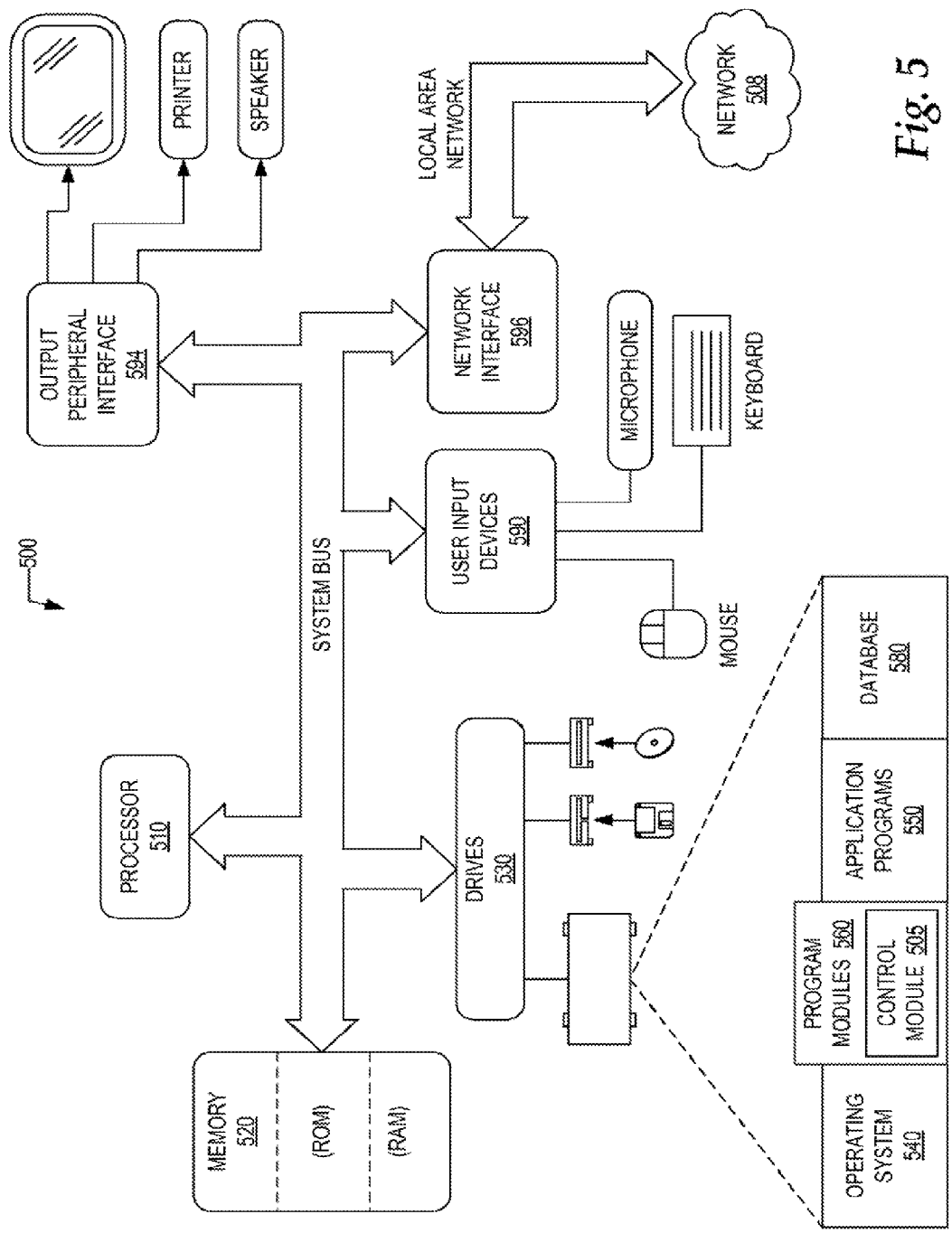
FIG. 5 is a block diagram illustrating an example computing system.

FIG. 5 is a computer architecture diagram showing an illustrative computer hardware architecture for an example computing system capable of implementing at least some embodiments presented herein. FIG. 5 includes a computer 500, including a processor 510, memory 520 and one or more drives 530. The computer 500 may be implemented as a conventional computer system, an embedded control computer, a laptop, or a server computer, a mobile device, a set-top box, a kiosk, a vehicular information system, a mobile telephone, a customized machine, or other hardware platform.

The drives 530 and their associated computer storage media, provide storage of computer readable instructions, data structures, program modules and other data for the computer 500. The drives 530 can include an operating system 540, application programs 550, program modules 560, and a database 580. The program modules 560 may include a control module 505. The control module 505 may be adapted to execute the process 400 for accelerating cache state transfer as described in greater detail above (e.g., see previous description with respect to one or more of FIGS. 1-4). The computer 500 further includes user input devices 590 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 510 through a user input interface that is coupled to a system bus, but may be coupled by other interface and bus structures, such as a parallel port, game port or a universal serial bus ("USB"). Computers such as the computer 500 may also include other peripheral output devices such as speakers, which may be coupled through an output peripheral interface 594 or the like.

The computer 500 may operate in a networked environment using logical connections to one or more computers, such as a remote computer coupled to a network interface 596. The remote computer may be a personal computer, a server, a router, a network PC, a peer device or other common network node, and can include many or all of the elements described above relative to the computer 500. Networking environments are commonplace in offices, enterprise-wide area networks ("WAN"), local area networks ("LAN"), intranets, and the Internet.

When used in a LAN or WLAN networking environment, the computer 500 may be coupled to the LAN through the network interface 596 or an adapter. When used in a WAN networking environment, the computer 500 typically includes a modem or other means for establishing communications over the WAN, such as the Internet or the network 508. The WAN may include the Internet, the illustrated network 508, various other networks, or any combination thereof. It will be appreciated that other mechanisms of establishing a communications link, ring, mesh, bus, cloud, or network between the computers may be used.

According to some embodiments, the computer 500 may be coupled to a networking environment. The computer 500 may include one or more instances of a physical computer-readable storage medium or media associated with the drives 530 or other storage devices. The system bus may enable the processor 510 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 520, whether characterized as RAM, ROM, flash, or other types of volatile or nonvolatile memory technology. The media may also represent secondary storage, whether implemented as the storage drives 530 or otherwise. Hard drive implementations may be characterized as solid state, or may include rotating media storing magnetically-encoded information.

The storage media may include one or more program modules 560. The program modules 560 may include software instructions that, when loaded into the processor 510 and executed, transform a general-purpose computing system into a special-purpose computing system. As detailed throughout this description, the program modules 560 may provide various tools or techniques by which the computer 500 may participate within the overall systems or operating environments using the components, logic flows, and/or data structures discussed herein.

The processor 510 may be constructed from any number of transistors or other circuit elements, which may individually or collectively assume any number of states. More specifically, the processor 510 may operate as a state machine or finite-state machine. Such a machine may be transformed to a second machine, or specific machine by loading executable instructions contained within the program modules 560. These computer-executable instructions may transform the processor 510 by specifying how the processor 510 transitions between states, thereby transforming the transistors or other circuit elements constituting the processor 510 from a first machine to a second machine. The states of either machine may also be transformed by receiving input from the one or more user input devices 590, the network interface 596, other peripherals, other interfaces, or one or more users or other actors. Either machine may also transform states, or various physical characteristics of various output devices such as printers, speakers, video displays, or otherwise.

Encoding the program modules 560 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 560 may transform the physical state of the semiconductor memory 520 when the software is encoded therein. For example, the software may transform the state of transistors, capacitors, or other discrete circuit elements constituting the semiconductor memory 520.

As another example, the storage media may be implemented using magnetic or optical technology such as drives 530. In such implementations, the program modules 560 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Turning now to FIG. 6, a schematic diagram that illustrates a partial view of a computer program product 600 that includes a computer program for executing a computer process on a computing device, arranged according to at least some embodiments presented herein. An illustrative embodiment of the example computer program product is provided using a signal bearing medium 602, and may include at least one instruction of 604: one or more instructions for initiating migration of a thread executing on a first core at a first tile from the first tile to a second tile in a multicore processor, one or more instructions for determining block addresses of blocks to be transferred from a first cache at the first tile to a second cache at the second tile; one or more instructions for identifying a third tile comprising a directory corresponding to the block addresses; one or more instructions for updating the directory to reflect that the second cache shares the blocks; or one or more instructions for transferring the blocks from the first cache to the second cache. In some embodiments, the signal bearing medium 602 of the one or more computer program products 600 include a computer readable medium 606, a recordable medium 608, and/or a communications medium 610.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations." without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the an would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to accelerate a cache state transfer in a multicore processor, the method comprising:
    initiating a migration of a thread, which executes on a first core at a first tile in the multicore processor from the first tile to a second tile in the multicore processor, wherein the first tile includes the first core and a first directory that maps a first set of block addresses and a first cache that is in the first tile, and wherein the second tile includes a second core and a second directory that maps a second set of block addresses and a second cache that is in the second tile;
    determining block addresses of blocks to be transferred from the first cache to the second cache based on the migration of the thread that executes on the first core at the first tile to the second tile in the multicore processor,
    identifying a third tile in the multicore processor, wherein the third tile includes a third directory that maps a third set of block addresses of a third cache in the third tile;
    updating the third directory to reflect that the second cache shares the blocks by sending a message from the first tile to the third tile;
    transferring the blocks from the first cache in the first tile to the second cache in the second tile to complete the migration of the thread from the first tile to the second tile;
    using a transfer status table to maintain first status information on the update of the third directory, and second status information on the transfer of the blocks from the first cache to the second cache; and
    based on the first status information and the second status information maintained in the transfer status table, determining whether to send at least one of an invalidation request or an intervention request from the first tile to the second tile.

2. The method of claim 1, wherein prior to the update of the third directory, the third directory indicates that the first cache contains the blocks and the second cache does not share the blocks.

3. The method of claim 1, wherein determining the block addresses of the blocks to be transferred from the first cache to the second cache includes scanning a cache tag array associated with the first cache.

4. The method of claim 1, further comprising:
    receiving, at the first tile, a successful directory update acknowledgement from the third tile prior to transferring the blocks from the first cache in the first tile to the second cache in the second tile.

5. The method of claim 1, wherein transferring the blocks from the first cache in the first tile to the second cache in the second tile includes transferring a portion of the blocks that are most recently used (MRU) from the first cache in the first tile to the second cache in the second tile.

6. The method of claim 5, further comprising:
    determining the portion of the blocks that are MRU based on an access pattern of the thread that executes on the first core at the first tile, wherein the access pattern of the thread includes a temporal reuse behavior of the thread.

7. The method of claim 1, wherein updating the third directory to reflect that the second cache shares the blocks further comprises updating a bit vector to reflect that the second cache contains the blocks, and wherein the third directory comprises the bit vector.

8. The method of claim 7, wherein the bit vector includes bits, wherein each of the bits is associated with a corresponding tile in the multicore processor, and wherein a value of each of the bits specifies whether the corresponding tile includes a corresponding cache that contains the blocks.

9. The method of claim 1, wherein transferring the blocks from the first cache in the first tile to the second cache in the second tile includes moving blocks from the first cache to the second cache such that the second cache stores the blocks and the first cache does not store the blocks.

10. A multicore processor, comprising:
    a first tile that comprises a first core, a first cache, and a first directory that maps a first set of block addresses of the first cache;
    a second tile that comprises a second core, a second cache, and a second directory that maps a second set of block addresses of the second cache;

a third tile that comprises a third core, a third cache, and a third directory that maps a third set of block addresses of the third cache; and a transfer status table operatively coupled to at least the first tile, wherein the multicore processor is configured to:

initiate a migration of a thread that executes on the first core at the first tile to the second tile;

determine block addresses of blocks to be transferred from the first cache to the second cache based on the migration of the thread that executes on the first core at the first tile to the second tile;

update the third directory to reflect that the second cache shares the blocks;

transfer the blocks from the first cache in the first tile to the second cache in the second tile to complete the migration of the thread from the first tile to the second tile;

use the transfer status table to maintain first status information on the update of the third directory, and second status information on the transfer of the blocks from the first cache to the second cache; and based on the first status information and the second status information maintained in the transfer status table, determine whether to send at least one of an invalidation request or an intervention request from the first tile to the second tile.

11. The multicore processor of claim 10, wherein to update the third directory, the first tile is configured to send a message to the third tile, and wherein the message includes a list of the block addresses of the blocks to be transferred from the first cache to the second cache and an identifier of the second cache, to which the blocks are to be transferred.

12. The multicore processor of claim 10, wherein to transfer the blocks from the first cache in the first tile to the second cache in the second tile, the multicore processor is configured to:

replicate the blocks between the first cache and the second cache such that the first cache and the second cache store the blocks.

13. The multicore processor of claim 12, wherein the replication of the blocks between the first cache and the second cache includes sending an instruction to update a main memory to clean dirty entries in the blocks.

14. The multicore processor of claim 13, wherein:
the main memory includes a shared memory architecture, and
the main memory is configured to operate with a directory based coherence protocol.

15. The multicore processor of claim 10, wherein to transfer the blocks from the first cache in the first tile to the second cache in the second tile, the multicore processor is configured to:

transfer the blocks from the first cache to the second cache concurrently with the update of the third directory to reflect that the second cache shares the blocks.

16. The multicore processor of claim 10, wherein:
the third set of block addresses corresponds to the block addresses of the blocks to be transferred from the first cache to the second cache, and
prior to the update of the third directory, the third directory indicates that the first cache contains the blocks and the second cache does not share the blocks.

17. The multicore processor of claim 10, wherein the transfer of the blocks from the first cache in the first tile to the second cache in the second tile occurs subsequent to receipt, at the first tile, of a successful directory update acknowledgement from the third tile.

18. A non-transitory computer-readable storage device having instructions stored thereon to accelerate a cache state transfer in a multicore processor, the instructions being executable by the multicore processor to perform or cause to be performed operations comprising:

initiating a migration of a thread, which executes on a first core at a first tile in the multicore processor, from the first tile to a second tile in the multicore processor, wherein the first tile includes the first core and a first directory that maps a first set of block addresses and a first cache that is in the first tile, and wherein the second tile includes a second core and a second directory that maps a second set of block addresses, and a second cache that is in the second tile;

determining block addresses of blocks to be transferred from the first cache to the second cache based on the migration of the thread that executes on the first core at the first tile to the second tile in the multicore processor;

identifying a third tile in the multicore processor, wherein the third tile includes a third directory that maps a third set of block addresses of a third cache that is in the third tile;

updating the third directory to reflect that the second cache shares the blocks;

transferring the blocks from the first cache in the first tile to the second cache in the second tile;

using a transfer status table to maintain first status information on the update of the third directory and second status information on the transfer of the blocks from the first cache to the second cache; and based on the first status information and the second status information maintained in the transfer status table, determining whether to send at least one of an invalidation request or an intervention request from the first tile to the second tile.

19. The non-transitory computer-readable storage device of claim 18, wherein the operations comprising transferring the blocks from the first cache in the first tile to the second cache in the second tile include operations that comprise:

transferring a portion of the blocks that are most recently used (MRU) from the first cache in the first tile to the second cache in the second tile; and determining the portion of the blocks that are MRU based on an access pattern of the thread that executes on the first core at the first tile, wherein the access pattern of the thread includes a temporal reuse behavior of the thread.

20. The non-transitory computer-readable storage device of claim 18, wherein the operations comprising transferring the blocks from the first cache in the first tile to the second cache in the second tile include operations that comprise:

replicating the blocks between the first cache and the second cache such that the first cache and the second cache store the blocks; and sending an instruction to update a main memory to clean dirty entries in the blocks, wherein the main memory includes a shared memory architecture, and wherein the main memory is configured to operate with a directory based coherence protocol.

* * * * *

UNITED STATES PATENT AND TRADEMARK OFFICE
CERTIFICATE OF CORRECTION

| | | |
|---|---|---|
| PATENT NO. | : 9,760,486 B2 | Page 1 of 1 |
| APPLICATION NO. | : 15/080605 | |
| DATED | : September 12, 2017 | |
| INVENTOR(S) | : Solihin | |

It is certified that error appears in the above-identified patent and that said Letters Patent is hereby corrected as shown below:

In Column 5, Line 20, delete "A 12A" and insert -- A 112A --, therefor.

In Column 5, Line 58, delete "A 12A." and insert -- A 112A. --, therefor.

In Column 5, Line 67, delete "A 12A" and insert -- A 112A --, therefor.

In Column 13, Line 55, delete "processor, one" and insert -- processor; one --, therefor.

In Column 15, Line 10, delete "the an would" and insert -- the art would --, therefor.

In Column 15, Line 56, in Claim 1, delete "processor from" and insert -- processor, from --, therefor.

In Column 15, Line 67, in Claim 1, delete "processor," and insert -- processor; --, therefor.

In Column 17, Lines 32-33, in Claim 11, delete "cache and an identifier of the second cache," and insert -- cache, and an identifier of the second cache --, therefor.

Signed and Sealed this
Twenty-first Day of August, 2018

Andrei Iancu
*Director of the United States Patent and Trademark Office*